(12) United States Patent
Lu et al.

(10) Patent No.: US 6,592,648 B2
(45) Date of Patent: Jul. 15, 2003

(54) REDUCTION OF IRON ORE IN ORE/COAL MIXTURES

(75) Inventors: Wei-kao Lu, Hamilton (CA); Dianbing Huang, Hamilton (CA)

(73) Assignee: McMaster University, Hamilton (CA)

( * ) Notice: Subject to any disclaimer, the term of this patent is extended or adjusted under 35 U.S.C. 154(b) by 0 days.

(21) Appl. No.: 09/843,737

(22) Filed: Apr. 30, 2001

(65) Prior Publication Data

US 2002/0029660 A1 Mar. 14, 2002

Related U.S. Application Data

(63) Continuation-in-part of application No. 09/192,927, filed on Nov. 16, 1998, now abandoned.
(60) Provisional application No. 60/066,078, filed on Nov. 17, 1997, and provisional application No. 60/104,952, filed on Oct. 20, 1998.

(51) Int. Cl.$^7$ .......................... C21B 13/10; C21B 13/12
(52) U.S. Cl. .............................. 75/503; 75/10.1; 75/504
(58) Field of Search ........................ 75/504, 10.1, 503

(56) References Cited

U.S. PATENT DOCUMENTS

| | | | |
|---|---|---|---|
| 3,443,931 A | 5/1969 | Beggs et al. | 75/33 |
| 4,701,214 A | 10/1987 | Kaneko et al. | 75/38 |
| 5,567,224 A | 10/1996 | Kundrat | 75/414 |
| 6,036,744 A | * 3/2000 | Negami et al. | 75/503 |

OTHER PUBLICATIONS

S. Sun and W–K. Lu "Mathematical Modeling of reactions in Iron Ore/Coal Composites" 1993 ISIJ International vol. 33 pp 1063–1069.*

W–K Lu, C. Bryk and H Gou "The LB Furnace for Smelting Reduction of Iron Ore" 1986 Proceedings of the 6$^{th}$ Process Technology (Fifth International Iron and Steel Congress) vol. 6 Washington Meeting Apr. 6–9 pp 1065–1075.*

D.Huang, T.Yang and L.Kong, A Process of Reduction ot Ore/coal Briquette withCirculating Gas (PGC) 1998 (vol. 57) 2$^{nd}$ International Congress on the Science and Technology of Ironmaking and 57$^{th}$ Ironmaking Conference Proceedings, TorontoMar. 22–25, pp1501–.*

* cited by examiner

Primary Examiner—Melvyn Andrews
(74) Attorney, Agent, or Firm—Robert F. Delbridge

(57) ABSTRACT

A process of reduction of iron ore and/or waste oxides in the form of agglomerate containing carbonaceous reductant on the hearth of a furnace includes providing a bed of agglomerates on the hearth of a furnace, the bed having a height of at least about 40 mm and having at least four layers of agglomerates. The carbonaceous reductant contains sufficient volatile matter, the volatile matter having a weight of at least about 10% of the weight of the reductant. The bed of agglomerates is heated with a radiant heat source having a temperature of at least about 1450° C. to cause the top of the bed to reach a temperature in the range of 1350° C. to 1530° C. to 1500° C. to reduce iron oxides in the iron ore and/or waste oxides to metallic iron.

5 Claims, 3 Drawing Sheets

REDUCTION OF IRON ORE IN ORE/COAL MIXTURES

RELATED APPLICATIONS

Figure 1:
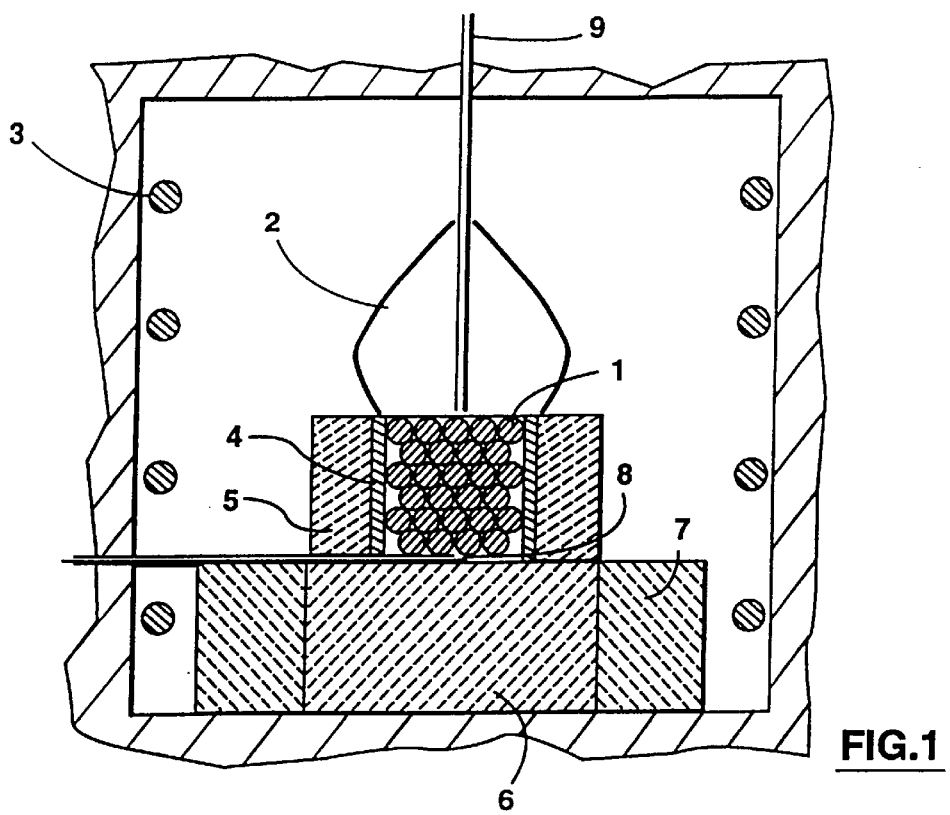

This application is a continuation-in-part of U.S. patent application No. 09/192,927 filed Nov. 16, 1998 now abandoned which claims priority from U.S. Provisional Patent Application No. 60/066078 filed Nov. 17, 1997 and from U.S. Provisional Patent Application No. 60/104952 filed Oct. 20, 1998, the contents of which are hereby incorporated herein by reference.

FIELD OF INVENTION

This invention relates to the reduction of mixtures of iron ore and/or waste oxides and carbonaceous reductants on the hearth of a furnace.

BACKGROUND OF INVENTION

For environmental and economical considerations, it is desirable when reducing iron ore and/or waste oxide by carbonaceous reductants on the hearth of a furnace to use iron ore concentrates directly without high temperature agglomeration and to use coal directly without coking.

The kinetic behaviour of a mixture of fine particles of iron ore concentrate and pulverized coal is very different from that of conventional iron ore agglomerates and coke lumps. In conventional ironmaking processes (e.g. blast furnace, Midrex, Hyl, SL/RN, etc.), the overall reaction rate increases with the increase of temperature but with diminishing effectiveness at higher temperatures. This is due to the fact that, at high temperatures, gaseous diffusion through gaseous boundary layers and metallic shells of agglomerates usually limits the reaction rate. Mass transfer in the gaseous phase is somewhat dependent on process temperature and almost independent of the total pressure in the system. Thus, there is little opportunity for operators to manipulate the system for higher reaction rate.

With a mixture of iron ore concentrate and/or waste oxides and pulverized coal, the situation is different. The interfacial area of reacting solids (ore and carbon) are very large, hence potentially resulting in a fast reaction rate. The distance between ore and coal particles is of the order of tens of microns, i.e., close to the mean free path of gases at higher temperatures. In view of the fact that the reactants are next to each other, resistance to overall reaction due to mass transfer of reactant to reaction sites is not significant. The accumulation of gaseous products ($H_2$, CO, $CO_2$ and $H_2O$) at reaction sites will cause the total pressure to rise. When the overall reaction rate is high, i.e. with higher gas pressure in the interior of the mixture, a viscous flow down the pressure gradient of the system will develop. In this case, gaseous diffusion of reaction products will not play a role in limiting the reaction rate.

However, although such an ore/coal mixture has large interfacial area and little resistance to mass transfer, the actual reaction rate is limited by interfacial chemical reactions which are sensitive to actual temperature at reaction sites. The interfacial temperature is a compromise between heat fluxes in the system and is adjusted to the momentary rate of heat transfer to the location and the rate of heat consumption by endothermic reactions in situ. At higher temperatures, the overall reaction rate of ore/coal mixture is likely to be limited by heat transfer. This has been confirmed by the Ph.D. thesis of S. Sun, accepted by McMaster University, of Hamilton, Ontario, Canada in August, 1997.

With an ore/coal mixture of fine particles, the major elementary steps in the overall reaction are:

(a) heat transfer to the surface of sponge, then to the reaction sites in the interior;
(b) carbonization of coal;
(c) reduction of iron oxide by CO and $H_2$;
(d) gasification of carbon by $CO_2$ and $H_2O$ to produce CO and $H_2$;
(e) flow of gas from the interior to the surface of the sponge.

In order to use coal efficiently, gases from step (e) should be collected and burned to generate heat to sustain endothermic reactions in steps (b), (c) and (d).

There is a major problem in the practice of step (a), namely the delivery of heat from an oxidizing flame to the surface of the sponge iron without re-oxidizing it back to iron oxide. It is known to resolve this problem by placing a physical barrier (as well as the medium for heat conduction) between the oxidizing flame and the sponge. Another approach, which is the practice of the INMETCO commercial operation in their rotary hearth furnace, is to prevent the flame from becoming dangerously oxidizing by introducing additional fuel to the flame. Heat is transferred directly to the surface of pellets of waste oxides and coal/coke mixture from a flame with a $CO/CO_2$ ratio of at least 2. However, these solutions have not been particularly satisfactory in practice with respect to energy efficiency.

There are other limitations in current practice. The height of pellet bed is usually about 20 to 25 mm, and in INMETCO practice the bed usually has no more than three layers of pellets. This limits the productivity of a rotary hearth furnace. In a higher bed with reductants of low volatile matter contents, the pellets below 20–25 mm from the top of the bed have difficulty in reaching a high degree of reduction even after a very long time. Metallurgical coke and low volatile coal are preferred as reductants. The temperature of the system, usually expressed as flame or furnace temperature, is usually about 1350° C. because higher temperature may cause slag formation and re-oxidation of sponge iron.

It is therefore an object of the present invention to provide an improved process for reducing iron ore and/or waste oxides in mixtures containing carbonaceous reductants.

SUMMARY OF INVENTION

It is understood that the term "ore/coal mixture" stands for mixtures of ore and/or waste oxides and carbonaceous reductants. The mixture may be in the form of pellets or briquettes.

The present invention is based on the discovery that the reduction of iron ore in an ore/coal mixtures can be significantly improved by changing several parameters simultaneously, as follows:

| | |
|---|---|
| Pellet bed height | at least about 40 mm |
| Volatile matter in coal | at least about 10% |
| Furnace temperature | at least about 1450° C. |

Accordingly, the present invention provides a process of reducing iron ore in an ore/coal mixture on the hearth of a furnace including providing a bed of iron ore/coal mixture on the hearth of a furnace, the bed having a height of at least about 40 mm and at least four layers of agglomerates, and the coal containing volatile matter with a weight of at least about 10% of the weight of the coal, and heating the bed of iron ore/coal mixture with a radiant heat source having a temperature of at least about 1450° C. to cause the top of the bed to reach a temperature in the range of from 1350 to 1530° C. to reduce iron oxides in the iron ore and/or waste oxides to metallic iron.

The thermal and chemical reactions in pellets/briquettes bed are independent of the shape of furnace and the movement of the hearth. The hearth in a furnace may be stationary as in our laboratory, or in a linear, rotational, or back-and-forth movement.

The atomic ratio of total carbon in reductants to combined oxygen in iron oxides in the mixture is preferably in the range of from about 0.7:1 to about 1.1:1, and more preferably in the range of from about 0.9:1 to about 1.0:1. The furnace temperature is preferably in the range of from about 1450 to about 1650° C., and the bed height is preferably higher than 60 mm (see FIG. 4).

The mixture may be provided as iron ore/coal agglomerates, with the bed having at least four layers thereof. The agglomerates may be iron ore/coal pellets, and the pellets may be in the size range of from about 10 to about 20 mm. Alternatively, the agglomerates may be briquettes of similar size.

The carbonaceous reductants may contain volatile matter with a weight on the average in the range of from about 10 to about 45% of the weight of the coal.

Embodiments of the invention will now be described, by way of example, with reference to the accompanying drawings, of which:

FIG. 1 is a diagrammatic view of a muffle furnace for treating iron ore concentrate and pulverized coal in accordance with the invention.

Figure 2:
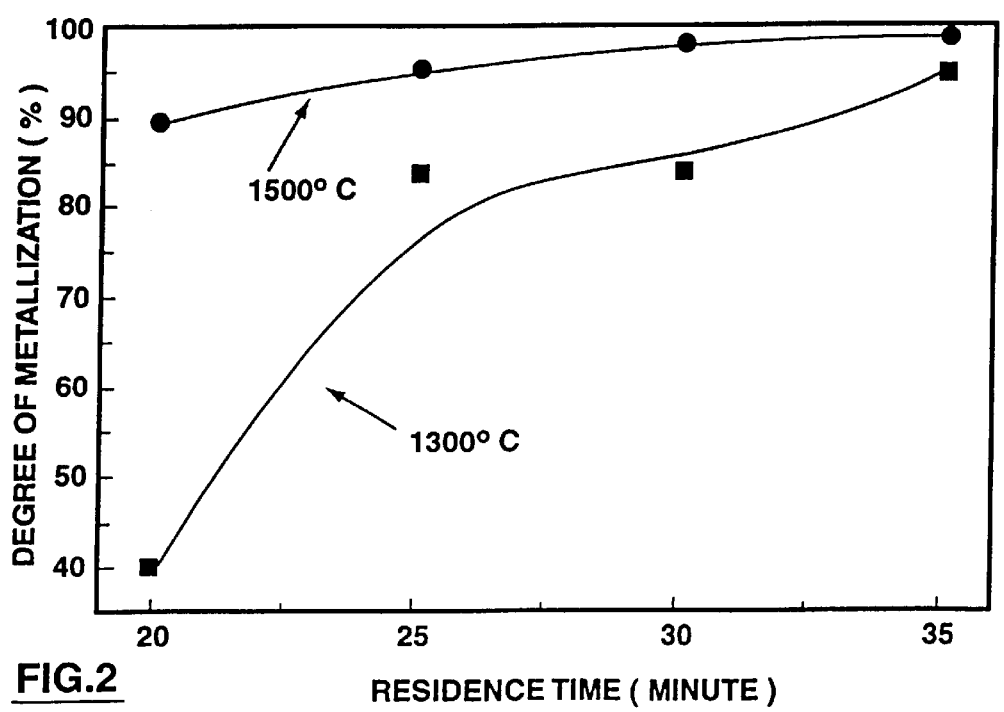
Figure 3:
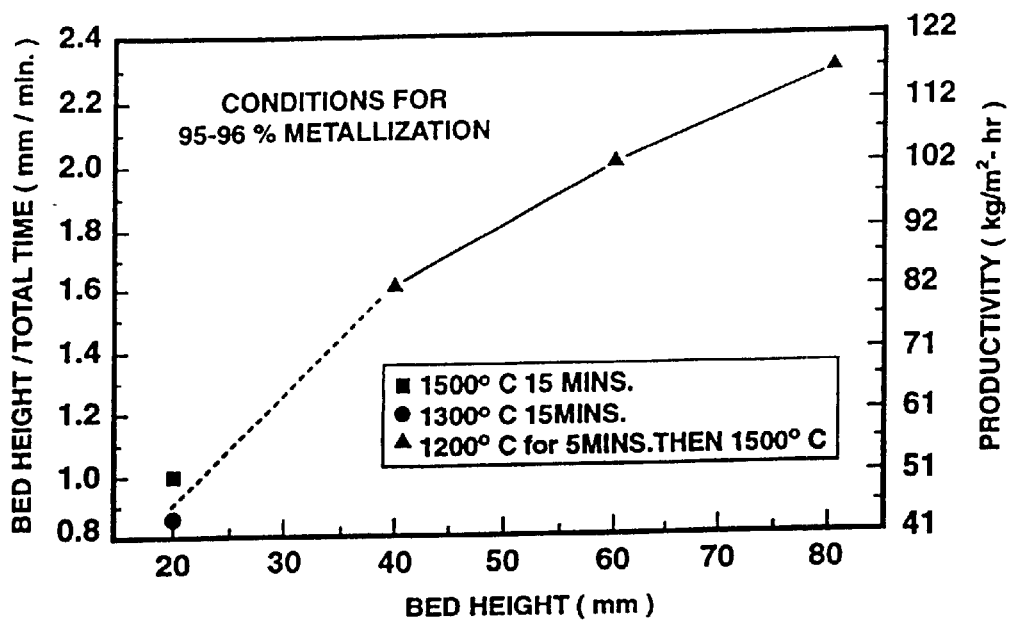
Figure 4:
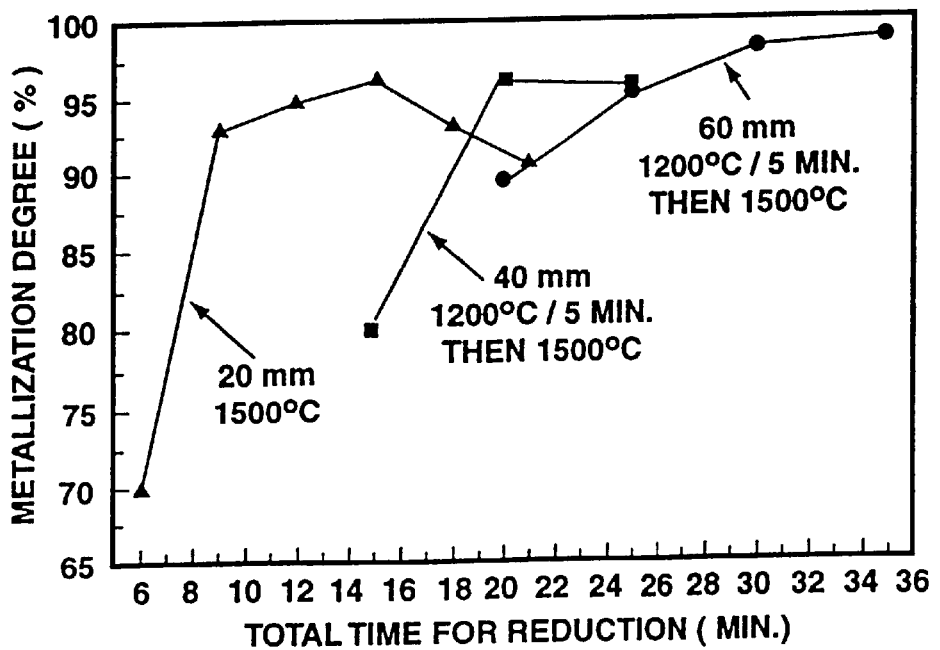
Figure 5:
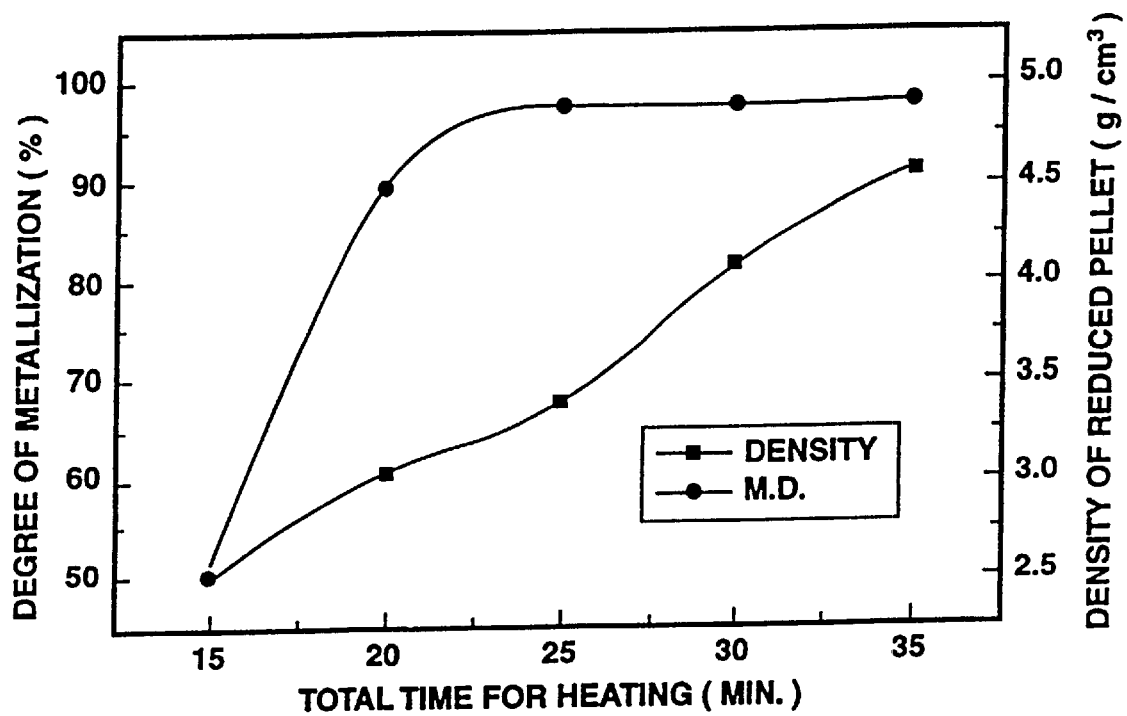

FIG. 2 is a graph showing the influence of furnace temperature on the reduction process where the bed height is 60 mm, FIG. 3 is a graph showing the relationship between productivity and bed height, FIG. 4 is a graph showing parameters of the reduction process particularly the re-oxidation of metallic iron with different bed heights, and FIG. 5 is a graph showing the relationship of density and metallisation to total reaction time.

DESCRIPTION OF PREFERRED EMBODIMENTS

Referring to the drawings, pellets of iron ore concentrate and pulverized coal are heated in a laboratory furnace to produce highly metallized iron in an air atmosphere, with a bed height up to 120 mm (limited by the size of the furnace) and a furnace temperature up to 1650° C. A schematic diagram of the muffle furnace is shown in FIG. 1, and it will be seen that there are six layers of pellets 1. The muffle furnace has electrical heating rods 3 of silicon carbide, a mullite ring 4, refractory bricks 5, 6 and 7. The furnace also has a thermocouple 8 and an alumina tube 9 for gas sampling or insertion of a thermocouple. The flame produced in the furnace is indicated by the reference numeral 2. A larger natural gas-fired furnace has also been used for this purpose.

The arrangement is such that the bed represents a layer of ore/coal mixture of much larger area of the hearth, namely by using the mullite ring 4 and the insulation brick 5 to keep heat flow and gas flow in the vertical and opposite directions. Compositions of typical raw materials used are given in the following tables.

| Taconite Composition (wt. %) | | | | | | | | |
|---|---|---|---|---|---|---|---|---|
| TFe | FeO | SiO$_2$ | CaO | MgO | Al$_2$O$_3$ | MnO | K$_2$O | S |
| 66.20 | 12.47 | 5.27 | 0.28 | 0.39 | 0.58 | 0.01 | 0.18 | 0.01 |

| Coal Composition (wt. %) | | | | | | | |
|---|---|---|---|---|---|---|---|
| Cfixed | Volatile | Ash | S | Ctotal | H | N | O |
| 57.34 | 34.53 | 6.90 | 1.23 | 77.54 | 8.50 | 1.30 | 4.53 |

The atmosphere inside the electrically heated muffle furnace is air. There is an aperture in the roof through which the sampling tube 9 is passed. The flow of air going through the door, 16 ring-gaps between SiC heating rods 3 and the furnace wall and the aperture in the roof is strong enough to maintain the flame 2 over the bed of pellets 1.

A person skilled in the art will readily appreciate that this laboratory arrangement renders it possible to predict results in a hearth furnace.

FIG. 2 shows the influence of furnace temperature on the degree of metallization when the mixture is placed inside the furnace. The ratio of ore to coal in the pellets (80:20), the size of the pellets (14 mm), the time includes both preliminary heating at 1200° C. (5 minutes) and subsequent specified temperature. The productivity, in terms of sponge iron produced per m$^2$ of surface of bed per hour (the time of five minutes for charging and discharging is included), is summarized in FIG. 3 to assess the contribution of various process parameters. FIG. 4 shows parameters of the reduction process with different bed heights, and also shows re-oxidation of sponge iron in a 20 mm bed which is of course undesirable.

Current literature on research and development and on commercial practice of rotary hearth furnaces indicates that the height of the bed of pellets (or fines) is usually about 20–25 mm and up to three layers of pellets, and that the peak temperature of the furnace is limited to about 1350° C. (1450° C. under nitrogen in the laboratory). Limitations of bed height and furnace temperature limit the productivity of the equipment. A temperature higher than the accepted limit would lead to the formation of slag and prevent the continuation of reduction. A bed higher than the accepted height will leave the portion of the bed next to the bottom unreduced even after a much longer than practical reaction time.

The interplay of various kinetic steps in this system has been studied, for example as documented in the following papers:

S. Sun and W-K. Lu, "Mathematical Modeling of reactions in Iron Ore/Coal Composites", 1993, ISIJ International, vol. 33, pp 1062–1 069.

W-K. Lu, C. Bryk and H Gou, "The LB Furnace for Smelting Reduction of Iron Ore" 1986, Proceedings of the 6$^{th}$ Process Technology Conference (Fifth International Iron and Steel Congress) vol. 6, Washington Meeting, April 6–9, pp. 1065–1075.

D. Huang, T. Yang and L. Kong, "A Process of Reduction of Ore/coal Briquette with Circulating Gas (PGC)", 1998 (vol. 57) 2$^{nd}$ International Congress on the Science and Technology of Ironmaking and 57$^{th}$ Ironmaking Conference Proceedings, Toronto, March 22–25, pp 1501–1509.

The peak temperature, bed height, and volatile matter in coal have been increased simultaneously by a proper amount. Even in an air atmosphere, the flow of rising gas from the charged bed can effectively prevent slag formation and re-oxidation of the sponge iron. The duration of this protective shroud depends on the height of the bed and the amount of coal and its volatile matter in the bed. A high furnace temperature, up to 1560° C., speeds up chemical reactions and more importantly the sintering of sponge iron. The extensive sintering of sponge iron leads to (a) a very dense product with high resistance to re-oxidation, and (b) much more space for heat radiation to reach lower layers.

It is believed that a combination of flame temperature, volatile matter in coal and bed height leads to the creation of a self-protective atmosphere and effective heat transfer outside and inside the pellets bed to produce sponge iron from mixture of iron ore and coal. Thus, the following are important features of the invention:

a) Thick agglomerate (pellet/briquette) bed having at least about 40 mm and having at least four layers of agglomerate
b) Furnace temperature up to 1650° C., maybe higher
c) Addition of carbonaceous reductant containing sufficient volatile matter based on raw materials properties for higher rate of reduction and for the composition of the sponge iron and its melting characteristics.

The present invention provides higher productivity by utilizing higher temperature and a thicker bed, and the shrouding of gases generated by reactions in an oxidizing atmosphere in the furnace which will lower fuel consumption in a rotary hearth furnace, and produce dense and strong sponge iron with high resistance to re-oxidation.

The advantages with respect to density are shown in FIG. 5 which shows the relationship of density and degree of metallisation of reduced pellets to the heating time. In these tests, in the electrically heated, the furnace temperature was 1200° C. for the first five minutes and 1500° C. for subsequent various times. The iron ore was taconite concentrate with 67.8% total iron, and the coal had total carbon content of 77.5% with 34.5% volatile matter. The atomic ratio of total carbon to combined oxygen was 0.9:1, and the bed height was 60 mm.

Other advantages, embodiments and examples of the invention will be readily apparent to a person skilled in the art, the scope of the invention being defined in the appended claims.

What is claimed is:

1. A process of reduction of iron ore and/or iron-containing waste oxides in the form of agglomerates containing carbonaceous reductant on the hearth of a furnace, including:

providing a bed of agglomerates on the hearth of a furnace, said bed having a height of at least about 60 mm and having at least four layers of agglomerates, the carbonaceous reductant containing sufficient volatile matter, said volatile matter having a weight of at least about 10% of the weight of the reductant, and heating the bed of agglomerates with a radiant heat source having a temperature of at least about 1450° C. to cause the top of the bed to reach a temperature in the range of 1350° C. to 1530° C. to reduce iron oxides in the iron ore and/or waste oxides to metallic iron.

2. A process according to claim 1 wherein the atomic ratio of total carbon in carbonaceous reductant to the combined oxygen in the iron oxides in the mixture is in the range of from about 0.7:1.0 to about 1.1:1.0.

3. A process according to claim 1 wherein the agglomerate of iron ore and/or waste oxides and carbonaceous reductant are pellets or briquettes.

4. A process according to claim 1 wherein the carbonaceous reductants are coal, coke and carbon in waste oxides.

5. A process according to claim 3 wherein the pellets are in the size range of from about 10 to 20 mm.

* * * * *